US009765681B2

(12) United States Patent
Wirth et al.

(10) Patent No.: US 9,765,681 B2
(45) Date of Patent: Sep. 19, 2017

(54) METHOD FOR PRODUCING AN EXHAUST-GAS AFTERTREATMENT DEVICE

(71) Applicant: EBERSPÄCHER EXHAUST TECHNOLOGY GMBH & CO. KG, Neunkirchen (DE)

(72) Inventors: Georg Wirth, Kirchheim/Teck (DE); Bernd Müller, Saarlouis (DE)

(73) Assignee: EBERSPÄCHER EXHAUST TECHNOLOGY GMBH & CO. KG, Neunkirchen (DE)

( * ) Notice: Subject to any disclaimer, the term of this patent is extended or adjusted under 35 U.S.C. 154(b) by 303 days.

(21) Appl. No.: 14/397,580

(22) PCT Filed: May 13, 2013

(86) PCT No.: PCT/EP2013/059783
§ 371 (c)(1),
(2) Date: Oct. 28, 2014

(87) PCT Pub. No.: WO2013/174668
PCT Pub. Date: Nov. 28, 2013

(65) Prior Publication Data
US 2015/0121845 A1    May 7, 2015

(30) Foreign Application Priority Data
May 21, 2012 (DE) .................. 10 2012 208 449

(51) Int. Cl.
*F01N 13/18* (2010.01)
*F01N 3/28* (2006.01)
*B23P 15/00* (2006.01)

(52) U.S. Cl.
CPC ............ *F01N 13/185* (2013.01); *B23P 15/00* (2013.01); *F01N 3/28* (2013.01); *F01N 3/2853* (2013.01);
(Continued)

(58) Field of Classification Search
CPC .... B23P 15/00; B23P 2700/03; F01N 13/185; F01N 13/1894; F01N 3/28; F01N 3/2867;
(Continued)

(56) References Cited

U.S. PATENT DOCUMENTS

| 3,798,006 A | * | 3/1974 | Balluff | .................. F01N 3/2867 |
| | | | | 422/179 |
| 3,975,826 A | | 8/1976 | Balluff | |
| 4,148,120 A | | 4/1979 | Siebels | |
| 4,163,042 A | | 7/1979 | Lynch | |
| 7,462,332 B2 | * | 12/2008 | Hardesty | ............... F01N 3/2853 |
| | | | | 422/179 |

(Continued)

FOREIGN PATENT DOCUMENTS

| CN | 1419627 A | 5/2003 |
| CN | 1854476 A | 11/2006 |

(Continued)

OTHER PUBLICATIONS

English Machine Translation of JP2005074398A, Mar. 24, 2005.*
(Continued)

Primary Examiner — Sarang Afzali
(74) Attorney, Agent, or Firm — McGlew and Tuttle, P.C.

(57) ABSTRACT

A method for producing an exhaust-gas aftertreatment device inserts a monolith in a housing, assembled from a circumferentially enclosed jacket and two end funnels. The monolith is axially inserted into the jacket with a circumferentially enclosing support mat. The funnels are connected to the jacket via an axial connecting section shaped complementary to the cross-section of the jacket, such that each connecting section and an axial end section of the support mat axially overlap. The jacket, including the connecting sections of the funnels are reduced from a starting cross-section to an end cross-section. This produces a predetermined radial preload in the support mat in a support area extending from the one connecting section to the other connecting section to retain the monolith in the jacket.

24 Claims, 8 Drawing Sheets

(52) U.S. Cl.
CPC ....... *F01N 3/2867* (2013.01); *F01N 13/1894* (2013.01); *B23P 2700/03* (2013.01); *F01N 2450/02* (2013.01); *F01N 2450/20* (2013.01); *F01N 2450/22* (2013.01); *Y10T 29/49398* (2015.01)

(58) Field of Classification Search
CPC ............... F01N 3/2853; F01N 2450/20; F01N 2450/22; F01N 2450/02; F01N 13/1805; F01N 3/2839; Y10T 29/49398
See application file for complete search history.

(56) References Cited

U.S. PATENT DOCUMENTS

| | | | | |
|---|---|---|---|---|
| 7,743,500 | B2* | 6/2010 | Kontz | F01N 3/2853 29/505 |
| 7,788,912 | B2* | 9/2010 | Hartmann | F01N 13/16 60/297 |
| 8,857,056 | B2* | 10/2014 | Keller | B21D 17/02 29/243.519 |

FOREIGN PATENT DOCUMENTS

| | | |
|---|---|---|
| CN | 101137825 A | 3/2008 |
| CN | 101248259 A | 8/2008 |
| CN | 201106468 Y | 8/2008 |
| CN | 102421997 A | 4/2012 |
| DE | 19505030 A1 | 8/1996 |
| DE | EP 1887194 A1 * | 2/2008 ........... F01N 3/0211 |
| EP | 1 074 704 A2 | 2/2001 |
| EP | 1 722 081 A1 | 11/2006 |
| EP | 1788213 A1 | 5/2007 |
| FR | 2 904 657 A1 | 2/2008 |
| JP | 56-64116 A | 6/1981 |
| JP | H111999-044213 A | 2/1999 |
| JP | 2000-045762 A | 2/2000 |
| JP | 2002-161726 A | 6/2002 |
| JP | 2002-227633 A | 8/2002 |
| JP | 2005-74398 A | 3/2005 |
| JP | 2008-511776 A | 4/2008 |
| JP | 2008-309072 A | 12/2008 |
| WO | 97/48 890 A1 | 12/1997 |
| WO | 03/074225 A1 | 9/2003 |

OTHER PUBLICATIONS

English Machine Translation of JPH1144213A, Feb. 16, 1999.*
English Machine Translation of JP2002227633A, Aug. 14, 2002.*
English Machine Translation of JP2000045762A, Feb. 15, 2000.*
English Machine Translation of EP1887194A1, Feb. 13, 2008.*

* cited by examiner

METHOD FOR PRODUCING AN EXHAUST-GAS AFTERTREATMENT DEVICE

CROSS REFERENCE TO RELATED APPLICATIONS

This application is a United States National Phase Application of International Application PCT/EP2013/059783 filed May 13, 2013 and claims the benefit of priority under 35 U.S.C. §119 of German Patent Application 10 2012 208 449.5 filed May 21, 2012, the entire contents of which are incorporated herein by reference.

FIELD OF THE INVENTION

The present invention relates to a method for producing an exhaust gas aftertreatment device. The invention additionally relates to an exhaust gas aftertreatment device for an exhaust system of an internal combustion engine, which can be arranged in particular in a motor vehicle.

BACKGROUND OF THE INVENTION

Exhaust gas aftertreatment devices, such as for example catalytic converters and particles filters, can comprise at least one monolith for the exhaust gas aftertreatment, which is retained in a housing with the help of a bearing mat enclosing the monolith in the circumferential direction. Such monoliths can be produced comparatively cost-effectively from ceramic materials. Ceramic materials are characterized by high temperature resistance. However, ceramic materials are comparatively brittle and have a thermal expansion coefficient which significantly differs from the thermal expansion coefficients of metals, which are usually employed for producing the housing. The bearing mat thus serves to protect the monolith from voltage peaks. On the other hand, the bearing mat has to be deformable elastically reversibly in order to be able to offset thermally-induced expansion effects. Furthermore, the bearing mat can also dampen vibrations and oscillations in order to thereby reduce the loading of the monolith. A further problem when using ceramic monoliths is production-related. While the metallic housing can be produced with comparatively close shape tolerances, the shape tolerances for producing ceramic monoliths are significantly greater. The bearing mats, too, can have geometries or densities which vary, in particular from lot to lot. In order to be able to fix the respective monolith with sufficient strength in the housing with the help of the respective bearing mat, a predetermined preload force however has to be realized with which the bearing mat can be pressed into a ring gap, which radially materializes between the monolith and a jacket of the housing. If compression is too weak, the monolith can axially move relative to the housing during operation. Furthermore, the aggressive hot exhaust gases during the operation of the exhaust gas aftertreatment device can attack and destabilize the bearing mat. If by contrast the compression is too severe, the bearing mat can no longer elastically absorb the thermal expansion effects, as a result of which the lifespan of the mounting or the retaining of the monolith in the housing is likewise greatly impaired. Additionally, the permissible stresses can then be exceeded on the monolith as a result of which the risk of damaging the monolith also arises. To sort this problem it is usual to individually adapt the housing with respect to its dimensions to the respective monolith in order to provide a desired gap width radially between the monolith and the jacket of the housing. The predetermined radial gap width then leads to a predetermined radial compression of the bearing mat in the assembled state, so that the bearing mat can optimally fulfill its functions.

Adapting the housing to the dimensions of the respective monolith can take place prior to inserting the monolith with the bearing mat in the jacket of the housing, so-called pre-sizing. Pre-sizing can be realized on the one hand in that a selection of housings with varying dimensions is kept in stock so that dependent on the respective monolith a housing that is suitable with respect to its dimensions can be installed. On the other hand it is possible to keep only one housing side in stock, which is matched to the largest monolith within the tolerance range. Since this standard housing is then too large, for most of the monoliths, a cross-sectional reduction has to be carried out before inserting the monolith in the jacket of the housing, which is possible with the help of suitable tools. During pre-sizing, introducing the monolith with the bearing mat in the housing is comparatively complex since during the axial insertion comparatively large shearing forces act on the bearing mat, as a result of which damages to the bearing mat can occur.

Alternatively to pre-sizing, a so-called post-sizing can also be carried out, during which the monolith is axially introduced with the bearing mat into a comparatively large-dimensioned jacket of a standard housing and with which subsequently, i.e. with the monolith inserted in the jacket and enveloped by the bearing mat, a cross-sectional reduction is carried out in order to individually adapt the dimensions of the jacket or of the housing to the dimensions of the respective monolith. The cross-sectional reduction for adapting the dimensions of the housing to the individual dimensions of the respective monolith can also be called "calibrating" of the housing, namely both during pre-sizing and also during post-sizing.

The housing usually consists of said material, which encloses the respective monolith with the bearing mat in the circumferential direction, and two funnels which are arranged at the face end of the jacket. Usually, the jacket and the two funnels are separate components so that the housing has to be assembled by attaching the two funnels to the jacket. Accordingly, at least one of the funnels has to be attached to the jacket after the inserting of the monolith. Usually, the respective funnel with a cylindrical connecting section can be plugged with the cylindrical jacket; either the funnel with its connecting section is plugged onto the jacket or into the jacket. Practically, jacket and funnel are fastened to one another by means of a closed circumferential weld seam in the circumferential direction.

Since the jacket through the calibrating can have varying cross sections, further problems for attaching the funnels arise since standard funnels are too large as a rule and weld seams are comparatively unstable for offsetting these dimensions. For reducing these problems it is possible in principle to also calibrate the funnels so that calibrated funnels can then be plugged with the calibrated jacket. Through this measure, a radial play between the respective face-end region of the jacket and the connecting section of the respective funnel overlapping said jacket can be reduced. Thus, the required weld seams can be configured smaller, which favors their strength.

In modern exhaust systems, in particular with smaller motor vehicles, there is frequently the desire to construct the respective exhaust gas aftertreatment device as compact as possible in the axial direction. This can be achieved in that within the housing the axial spacing between the monolith and the funnels is selected as small as possible. A further reduction of the dimensions can only be achieved in that the respective plugging region, in which the jacket and the respective funnel are plugged into one another, axially overlaps with an axial end region of the monolith. Because of this, new problems are created however since with plugged-in funnel the respective connecting section of the funnel then axially enters the ring gap between monolith and jacket, which impairs the installation space that is available for the bearing mat. With plugged-on funnel, however, an axial region of the jacket, in which the required calibrating can be carried out, is reduced. There is thus the risk altogether that the bearing mat can no longer optimally fulfill its retaining function.

SUMMARY OF THE INVENTION

The present invention deals with the problem of providing an improved embodiment for an exhaust gas aftertreatment device of the type mentioned at the outset or for an associated production method which is characterized in particular in that an axially compact design with adequate retaining function of the bearing mat can be realized.

The invention is based on the general idea of producing the exhaust gas aftertreatment device according to the post-sizing principle and to perform calibrating with funnels plugged with the jacket, wherein the funnels in their connecting sections are axially plugged with the jacket so far that the respective connecting section of the respective funnel axially overlaps an axial end section of the bearing mat. During calibrating, the jacket is then calibrated over its entire axial length including its end regions with which the funnels are plugged, i.e. subjected to a cross-sectional reduction. The cross-sectional reduction is thus carried out both in the connecting sections, in which a two-layered configuration of coaxially arranged funnel and jacket is present, and also in a bearing region, which axially extends from the one connecting section as far as to the other connecting section and in which a single-layered configuration is present, which is only formed by the jacket. Through the joint calibrating of jacket and plugged funnel logistics are simplified since only a standard size for the jacket and the funnels has to be kept in stock. At the same time, a radial gap between the connecting section of the respective funnel and the end section of the jacket running coaxially thereto is eliminated through the joint calibrating so that funnel and jacket are plugged into one another radially free of play. Because of this, realizing an adequately strong weld seam is simplified, since the latter does not have to bridge a radial gap at any point. It has been shown, furthermore, that the axial overlap of the respective connecting section with the bearing mat is less disadvantageous than expected. In particular, sealing of the bearing mat with respect to the exhaust gas is not impaired. Altogether, an extremely short or compact design for the exhaust gas aftertreatment device can be realized on the respective axial face end in the axial direction through the axial overlap of the respective connecting section of the respective funnel with an axial end region of the bearing mat and thus also of the jacket and of the monolith.

According to an advantageous embodiment, calibrating can be carried out so that the cross-sectional reduction is identical in size in the bearing region and in the connecting sections. This means that the jacket including the end regions with the plugged connecting sections of the funnels over its entire axial length has a constant outer cross section after calibrating. Because of this, the calibrating operation is particularly simple. In particular, a conventional calibrating tool can be used for this purpose. Since in the face-end sections of the jacket through the plugged connecting sections of the funnels a double wall is present, increased radial compression of the bearing mat results with this configuration in the region of the axial overlap with the bearing mat. In particular, the bearing mat is compressed more strongly by the wall thickness of the wall sections in the connecting sections, at least in particular when the bearing mat in turn has a constant wall thickness in the axial direction.

According to an advantageous further development it can now be provided to configure the bearing mat in the respective overlap region with a reduced wall thickness and/or with a reduced density. In particular, the bearing mat can have an annular step or an axial groove in the respective overlap region which with respect to its geometry can be matched to the wall thickness of the respective connecting section. In this way, a largely homogeneous compression can be realized over the entire axial extension of the bearing mat even when in the overlap regions the radial gap is smaller than in the bearing region.

In another embodiment, calibrating by contrast can be carried out so that the cross-sectional reduction in the bearing region is greater than in the connecting sections. This means that following the calibrating the outer cross section of the jacket is constant over the entire axial length of the bearing region and in the end regions plugged with the connecting vessels of the funnels is greater than in the bearing region, i.e. is stepped or comprises a step. In other words, the wall doubling in the overlap regions is taken into account, as a result of which it is possible in particular to realize a largely constant gap width for the radial gap over the entire axial length of the bearing mat. Thus, a homogeneous compression of the bearing mat over the entire axial length can be realized. This applies in particular when the cross-sectional reduction in the bearing region is greater by the wall thickness of the respective connecting section than in the respective connecting section.

In order to realize such a cross-sectional reduction which is inhomogeneous along the jacket, a special calibrating tool is advantageous which has a pushing contour shaped complementarily to the outer contour of the jacket for applying pressure forces reducing the cross section of the jacket. This calibrating tool accordingly is configured so that its pushing contour in the region of the connecting sections comprises a step each which represents a setback. Preferentially, the dimension of the step in radial direction is matched to the wall thickness of the respective connecting section. The inhomogeneous cross-sectional reduction in the finished housing leads to an outer cross section which is greater in the overlap regions than in the bearing region.

According to an advantageous embodiment, the funnels are axially fixed in the calibrating tool relative to the jacket in order to avoid axial yielding of the funnels during calibrating. Additionally or alternatively it can be provided to fasten the funnels to the jacket after the assembly and prior to the calibrating. Such fastening can for example be realized by means of one or multiple spot welds or by means of a (temporary) weld seam. Thereby, the funnels can also be fixed to the jacket for the calibrating.

After the calibrating, the funnels are each preferentially fastened to the jacket by at least one closed circumferential (final) weld seam. Since the funnels where jointly calibrated with the jacket, the funnels are plugged with the jacket radially free of place as a result of which the respective weld seam can be realized comparatively small. Because of this, the respective weld seam is provided with a particularly high fatigue strength.

According to a further development of the method it can be provided that prior to assembling the housing the at least one monolith and/or the at least one bearing mat are measured in order to determine parameters required for the calibrating. Calibrating is then carried out dependent on the previously determined parameters. Such parameters are usually the cross-sectional geometry of the monolith and the thickness and/or density of the bearing mat.

An exhaust gas aftertreatment device according to the invention is thus characterized in that the jacket together with the plugged connecting sections has been reduced through forming from an initial cross section to a final cross section in such a manner that the jacket and the funnels are plugged into one another radially free of play. A cross-sectional reduction through forming can be substantiated in the structure of the jacket and of the funnel. It can likewise be substantiated with the help of microstructures, which develop during forming on the contact surfaces of funnel and jacket, that jacket and funnel were jointly formed.

Particularly advantageous is a further development, in which the jacket and the connecting sections of the funnels are radially preloaded against one another. Such radial preload can be achieved in that during the forming for the cross-sectional reduction the respective component located radially inside is more strongly deformed within the plug region. Since any plastic forming is also accompanied by an elastic forming, the relaxing of the formed components that occur after the forming can result in that the component located inside can theoretically relax more strongly than the component located outside, but is practically prevented from doing so by the component located outside, as a result of which the desired radial preload between the jacket and the respective connecting section is created.

According to another embodiment, the jacket can comprise a step on at least an axial end region, in which the respective connecting section of the bearing mat overlaps. Such a configuration is obtained through the inhomogeneous cross-sectional reduction described above.

Alternatively, an embodiment is also conceivable, in which the bearing mat is radially more strongly compressed in the respective overlap region at least in an axial end region of the jacket than in a bearing region extending from the one connecting section to the other connecting section. Such a constellation can result in particular when the homogeneous cross-sectional reduction described above is carried out.

Practically, both end regions comprise such a step or the bearing mat is more greatly compressed in both overlap regions than in the bearing region. In principle, however, a combined design is also conceivable in which in the one end region a step is present while in the other end region stronger compression is provided.

The invention additionally relates to a calibrating tool for calibrating a housing of such an exhaust gas aftertreatment device. Such a calibrating tool accordingly is characterized by a pushing contour for applying pressure forces reducing the cross section of the jacket, wherein this pushing contour in the region of the connecting sections has a step each, which in particular takes into account the wall thickness of the respective connecting section.

The geometry of the monolith and the cross section of the jacket are of no consequence to the method, to the exhaust gas aftertreatment device and to the calibrating tool. Usual are above all round cross sections, for example with circular, oval or elliptical geometry. Alternatively, however, angular cross sections are also employed for example with a rectangular, hexagonal or triangular geometry. It is clear that the angular cross sections can be embodied suitably rounded in their corners.

It is to be understood that the features mentioned above and still to be explained in the following cannot only be used in the respective combination stated but also in other combinations or by themselves without leaving the scope of the present invention.

Preferred exemplary embodiments of the invention are shown in the drawing and are explained in more detail in the following description, wherein same reference characters relate to same or similar or functionally same components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7a is a highly simplified longitudinal sectional view of the exhaust gas aftertreatment device in the region of a funnel before calibrating, according to another embodiment;

FIG. 7b is a highly simplified longitudinal sectional view of the exhaust gas aftertreatment device in the region of a funnel after calibrating, according to the another embodiment of FIG. 7a;

FIG. 8a is a highly simplified longitudinal sectional view of the exhaust gas aftertreatment device in the region of a funnel before calibrating, according to another embodiment;

FIG. 8b is a highly simplified longitudinal sectional view of the exhaust gas aftertreatment device in the region of a funnel after calibrating, according to the another embodiment of FIG. 8a;

FIG. 9a is a highly simplified longitudinal sectional view of the exhaust gas aftertreatment device in the region of a funnel before calibrating, according to another embodiment;

FIG. 9b is a highly simplified longitudinal sectional view of the exhaust gas aftertreatment device in the region of a funnel after calibrating, according to the another embodiment of FIG. 9a;

DESCRIPTION OF THE PREFERRED EMBODIMENTS

Figure 1:
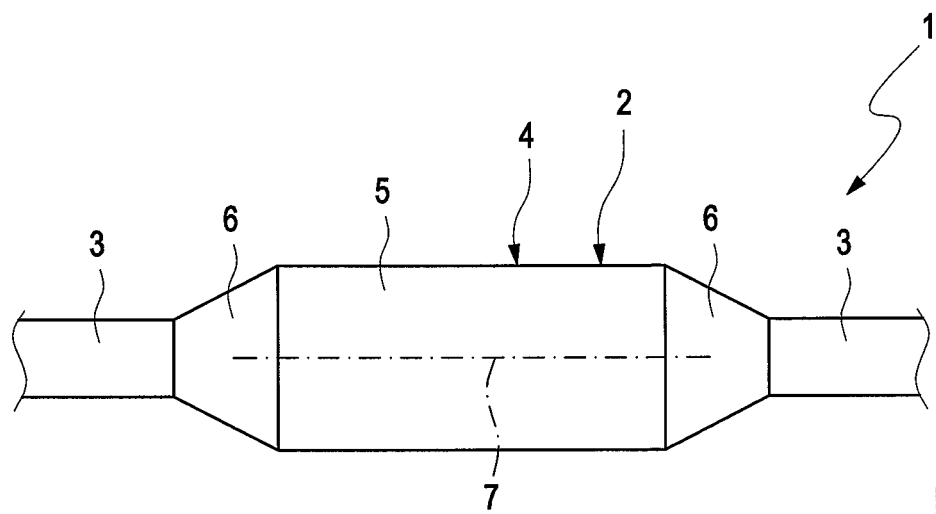
FIG. 1 is a highly simplified schematic representation of an exhaust system in the region of an exhaust gas aftertreatment device.

Referring to the drawings, according to FIG. 1, an exhaust system 1 for discharging exhaust gases of an internal combustion engine which is not shown here, which can be arranged in particular in a motor vehicle, comprises at least one exhaust gas aftertreatment device 2, which is incorporated in an exhaust line 3 of the exhaust system 1. The exhaust gas aftertreatment device 2 comprises a housing 4, which comprises a jacket 5 and two face-end funnels 6. The exhaust gas aftertreatment device 2 comprises a housing 4, which comprises a jacket 5 and two face-end funnels 6. Accordingly, the jacket 5 is closed in a circumferential direction, which relates to a longitudinal direction or axial direction 7 of the housing 4. In the half sections of FIGS. 6 to 10, the longitudinal axis 7 simultaneously represents a longitudinal center axis in which a symmetry plane is located.

Figure 2:
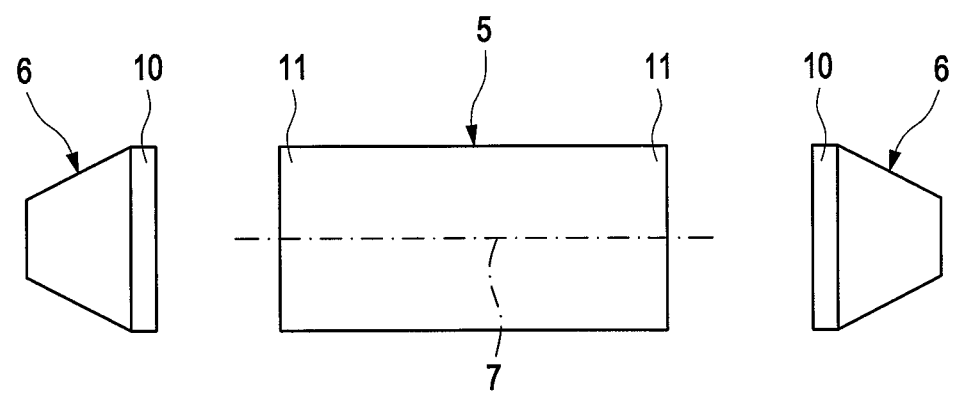
FIG. 2 is an expanded representation of the exhaust gas aftertreatment device.
Figure 2:
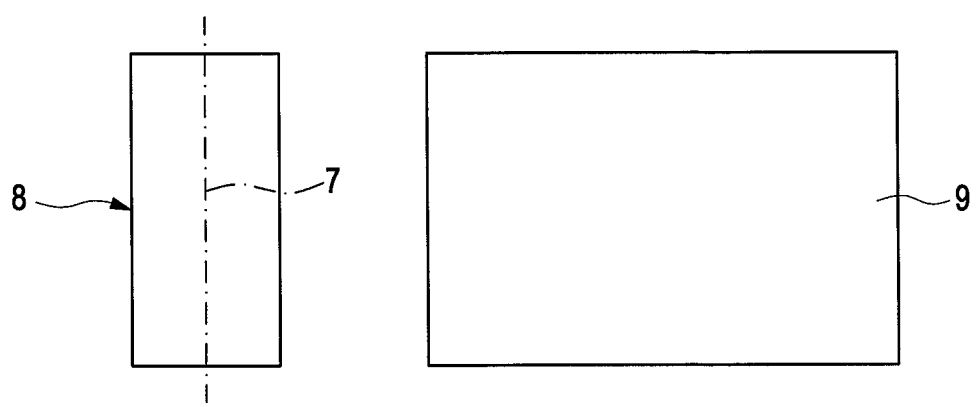
Figure 3:
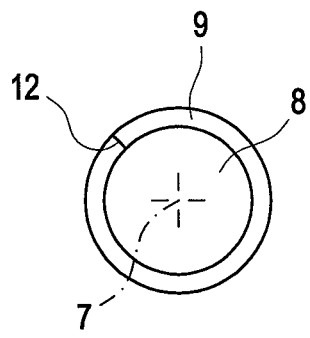
FIG. 3a is an end view of a monolith with bearing mat.
FIG. 3b is a lateral view of a monolith with bearing mat.
Figure 3:
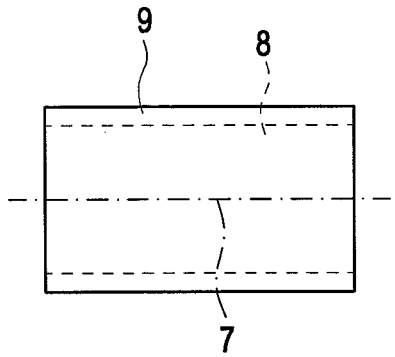
Figure 4:
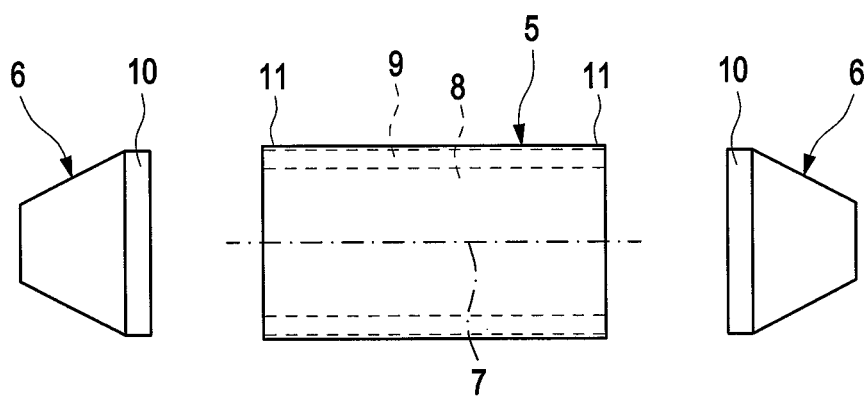
FIG. 4 is an expanded representation of the exhaust gas aftertreatment device during the assembly.

As is evident from the FIGS. 2 to 4, the jacket 5 and the funnels 6 form separate components which have to be assembled to form the housing 4. The housing 4 serves for accommodating at least one monolith 8 and at least one bearing mat 9, which in the assembled state encloses the monolith 8 in the circumferential direction.

Figure 8:
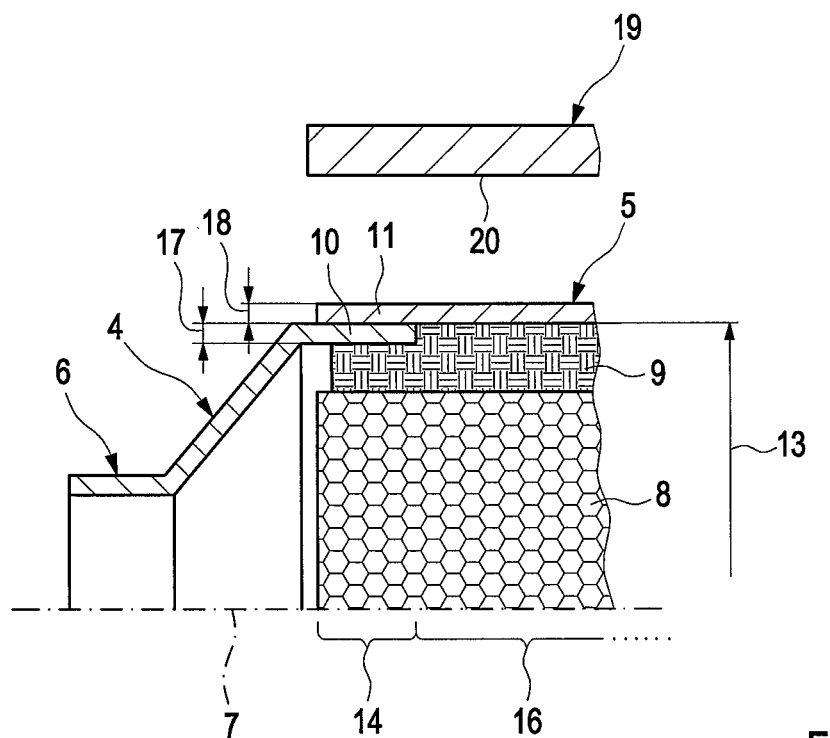
Figure 8:
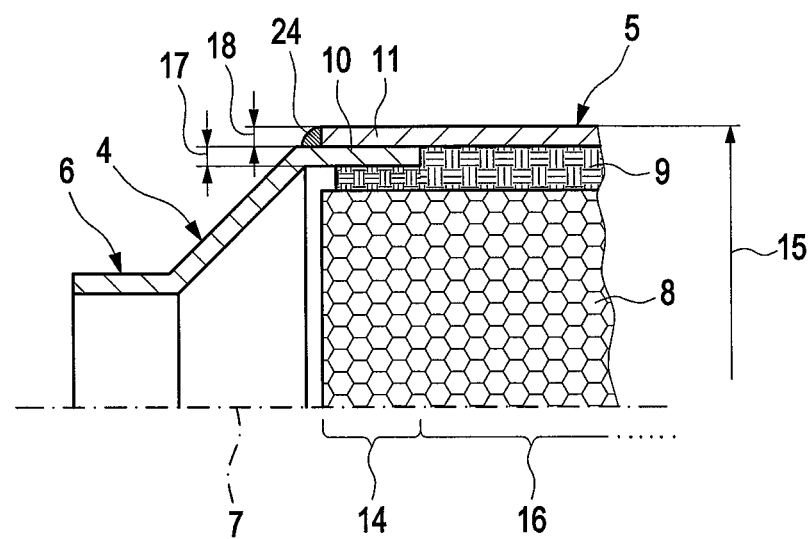
Figure 9:
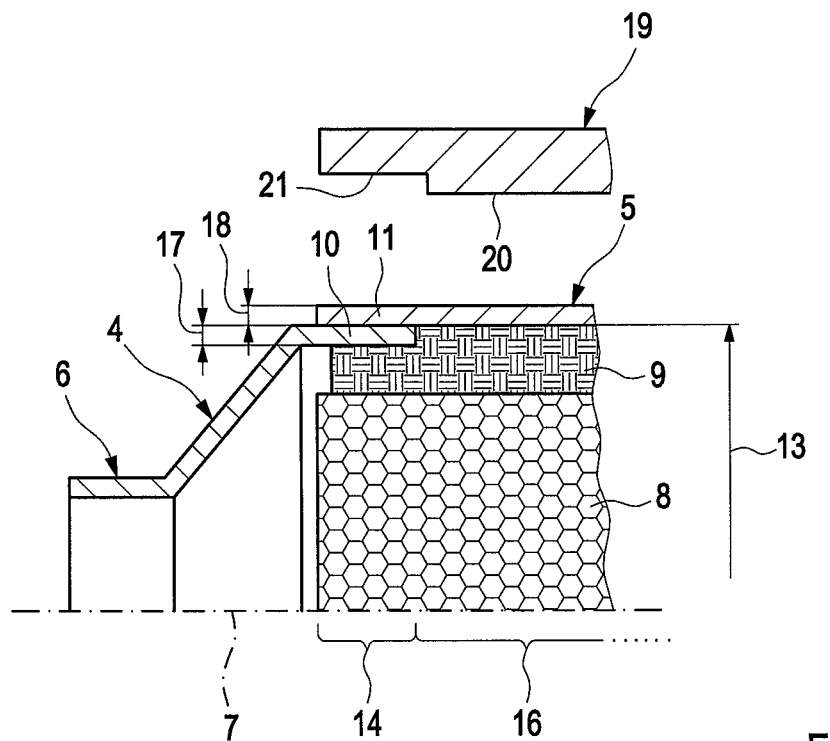
Figure 9:
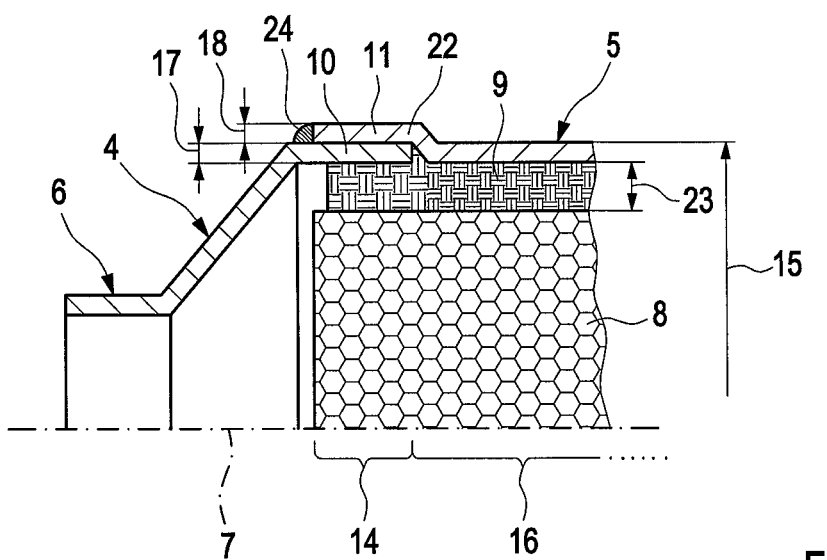

In FIG. 2, the monolith 8 is perpendicularly turned relative to the housing 5 which is evident by the two longitudinal axes 7 running at 90° to one another. The bearing mat 9 is represented in the unrolled initial state. The respective funnel 6 has a connecting section 10 facing the jacket 5, which is formed complementarily to the jacket 5 in such a manner that the respective funnel 6 can be plugged with the jacket 5. In particular, the jacket 5 has a cylindrical cross section. Complementarily thereto, the connecting sections 10 then also have such a cylindrical cross section each. The funnels 6 can be plugged into the respective face end axial end region 11 of the jacket 5, which is shown in the embodiments of FIGS. 8 and 9, or plugged onto the jacket 5, which is shown in the versions of the FIGS. 6 and 7. A mixed design is also conceivable, in which the one funnel 6 is plugged into the jacket 5 while the other funnel 6 is plugged onto the jacket 5.

Figure 5:
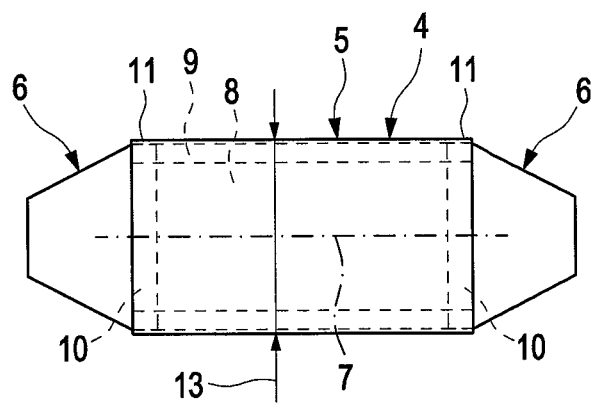
FIG. 5 is a lateral view of the assembled exhaust gas aftertreatment device.

For the assembly of the exhaust gas aftertreatment device 1 or for assembling and filling the housing 4, the respective monolith 8 according to the FIGS. 3a and 3b is initially provided with the respective bearing mat 9 so that the bearing mat 9 encloses the monolith 8 in the circumferential direction. A corresponding circumferential butt joint of the bearing mat 9 is marked with 12 in FIG. 3a. Following this, the monolith 8 is axially plugged into the jacket 5 together with the bearing mat 9. Following this, the funnels 6 are plugged onto the jacket 5, which is hinted in FIG. 4. Following this, the state of the housing 4 shown in FIG. 5 is present, in which the jacket 5 has an initial outer cross section 13. Following this, calibrating of the housing 4 is carried out which is explained in more detail in the following with the help of the FIGS. 6 to 9.

According to the FIGS. 6 to 9, the respective funnel 6 with its connecting section 10 is plugged onto the jacket 5 or plugged into the jacket 5 so that the respective connecting section 10 and an axial end section 14 of the bearing mat 9 axially overlap. Thus, the housing 4 and thus the exhaust gas aftertreatment device 2 is an extremely short construction in the axial direction 7.

During calibrating, the jacket 5 including the end regions 11, in which the connecting sections 10 of the funnels 6 are located, is now reduced starting out from the initial cross section 13 to a final cross section 15 in such a manner that at least in a bearing region 16 a predetermined preload for retaining the monolith 8 in the jacket 5 is created in the bearing mat 9. The bearing region 16 axially extends from the one connecting section 10 of the one funnel 6 as far as to the other connecting section 10 of the other funnel 6, i.e. between the end sections 11.

Figure 6:
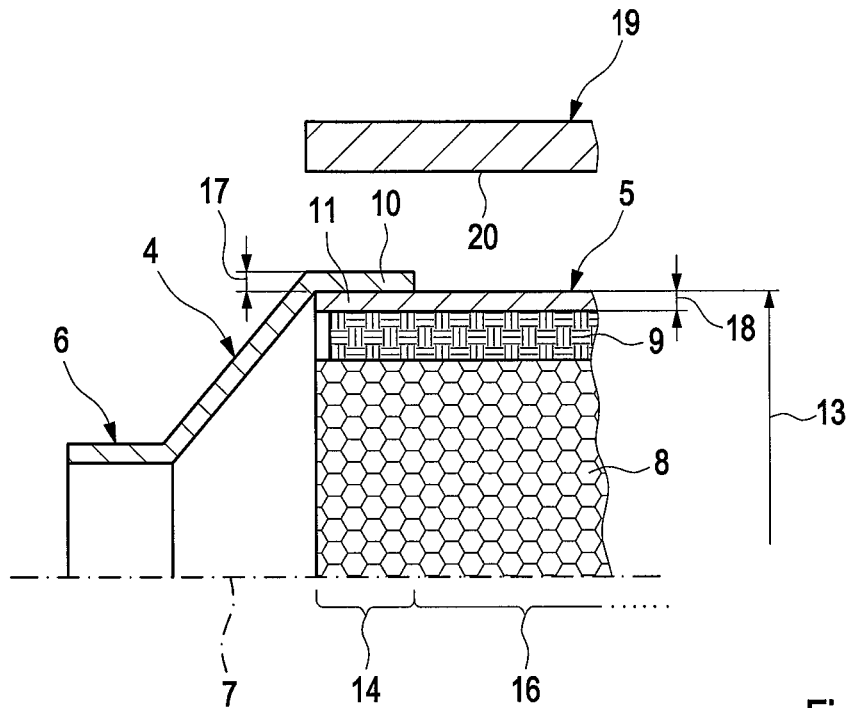
FIG. 6a is a highly simplified longitudinal sectional view of the exhaust gas aftertreatment device in the region of a funnel before calibrating.
FIG. 6b is a highly simplified longitudinal sectional view of the exhaust gas aftertreatment device in the region of a funnel after calibrating.
Figure 6:
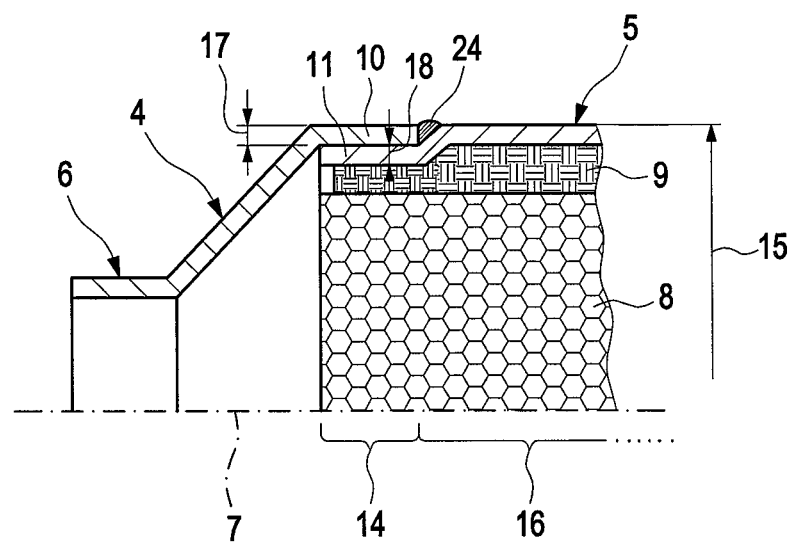

In the embodiments of the FIGS. 6 and 8, calibrating is effected in such a manner that the cross-sectional reduction in the bearing region 6 and in the connecting regions 14 is approximately identical in size. As a consequence, a constant outer cross section, namely the final cross section 15 is obtained over the entire axial length of the jacket 5 including the connecting sections 10. Since in the end sections 11 a wall thickness 17 of the respective connecting section 10 is added to a wall thickness 18 of the jacket 5, a correspondingly greater radial compression is obtained in the overlap region 14 of the bearing mat 9. In other words, with this procedure the bearing mat 9 in the overlap region 14 with the respective connecting section 10 is more strongly compressed than in the bearing region 16.

In the FIGS. 6a and 8a, a calibrating tool 19 is hinted which comprises a pushing contour 20. This pushing contour 20 is formed complementarily to the upper contour of the jacket 5 and serves for applying pressure forces reducing the cross section of the jacket 5.

Figure 7:
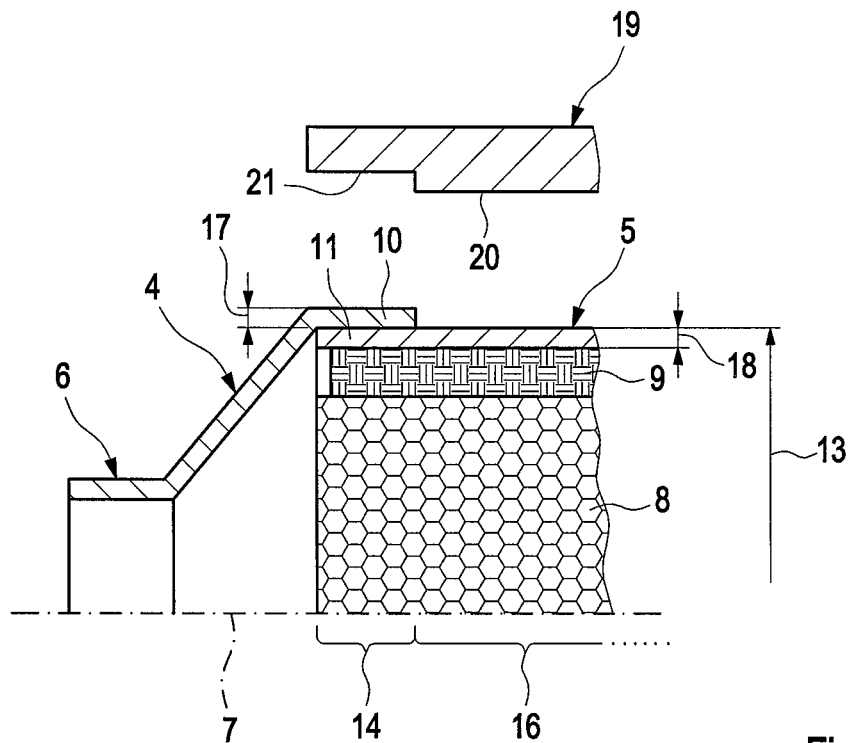
Figure 7:
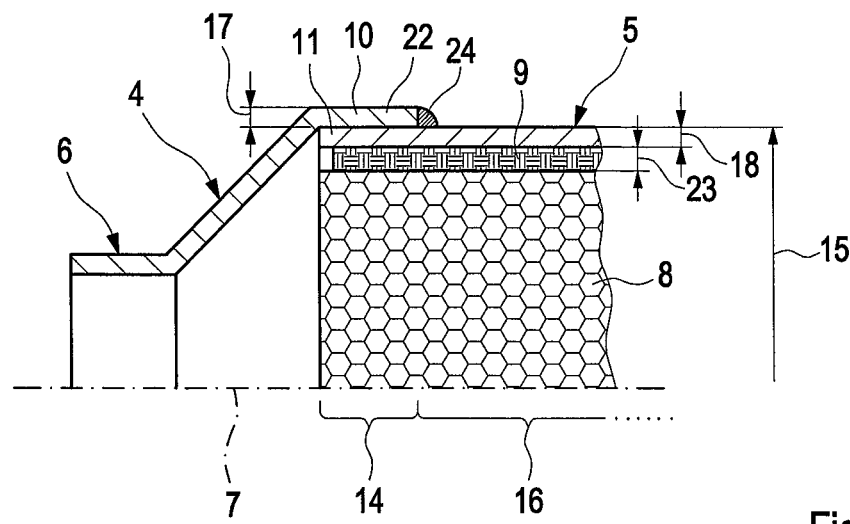

In the embodiments of the FIGS. 7 and 9, calibrating is effected in such a manner that the cross-sectional reduction in the bearing region is greater than in the connecting sections 10. To this end, the previously mentioned calibrating tool 19 can have a step 21 in its pushing contour 20 in the region of the respective connecting section 10 which is practically dimensioned approximately identical in size as wall thickness 17 of the connecting section 10 in radial direction. During the forming, an inhomogeneous outer contour profile such as is evident for example in FIGS. 7b and 9b is then obtained. In these cases, the housing 4 then has a step 22 on the respective axial end region 11 of the jacket 5 which in the plugged-on version according to FIG. 7b is formed through the connecting section 10 of the respective funnel 6 and which in the plugged-in version according to FIG. 9b is formed by a cranked end region 11 of the jacket 5.

The respective step 21 of the calibrating tool 19 practically takes into account the wall thickness 17 of the connecting section 17 in such a manner that after the calibrating a substantially homogeneous radial compression is obtained within the bearing mat 9 along the entire axial length of the bearing mat 9. Evidently with the embodiments of the FIGS. 7b and 9b, a radial gap 23 is identical in size over the entire axial length of the monolith 8, wherein said radial gap 23 is present radially between the monolith 8 and the jacket 5. The bearing mat 9 is compressed in this radial gap 23. It is remarkable that in the embodiments of FIGS. 7b and 9b the radial gap 23 in the bearing region 16 is approximately identical in size as in the respective overlap region 14.

Following the calibrating, the respective funnel 6 can be fastened on the jacket 5 by at least one closed circumferential weld seam 24.

Figure 10:
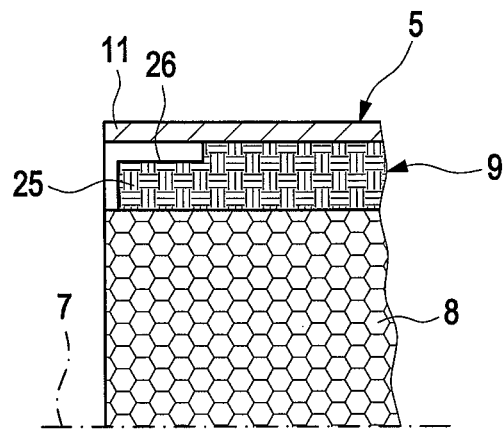
FIG. 10 is a longitudinal sectional view of the exhaust gas aftertreatment device in an axial end region, without funnel, with a special embodiment of the jacket.

FIG. 10 shows an embodiment in which the bearing mat 9 comprises an annular step 26 in its axial end region 25. The annular step 26 can for example simplify the axial plugging-in of the connecting section 10 in the end section 11 of the jacket 5 shown in FIG. 9a. In principle, such a stepped embodiment is also suitable for the version with plugged-on funnel 6, since through the stepped configuration of the bearing mat 9 the radial compression in its end section 25 can be reduced even when according to FIG. 6b or according to FIG. 8b the radial gap 23 following calibrating is smaller in the overlap region 14 than in the bearing region 16. In the embodiment shown in FIG. 10, the step 26 is molded radially outside in the end region 25 of the bearing mat 9. Thus, this embodiment is particularly suitable for a plugged-in funnel 6 according to the FIGS. 9a and 9b. Alternatively, the step 26 can also be molded on the bearing mat 9 radially inside. Conceivable is also a version with two steps 26, wherein the one annular step is then arranged radially outside while the other annular step is then arranged radially inside.

Figure 11:
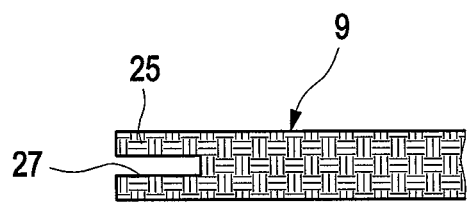
FIG. 11 is a longitudinal sectional view showing a further embodiment of the jacket.
Figure 12:
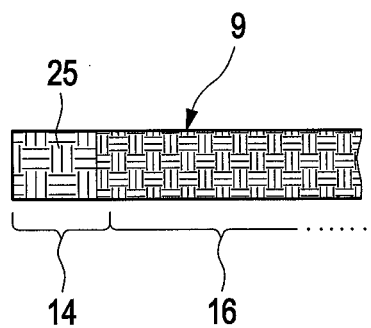
FIG. 12 is a longitudinal sectional view showing a further embodiment of the jacket.

FIG. 11 shows an embodiment of the bearing mat 9, in which instead of such a step 26, an axial open groove 27 is worked into the end region 25 of the bearing mat 9 in order to reduce the radial compression. While in the embodiments of FIGS. 10 and 11 the bearing mat 9 altogether has a homogeneous density, FIG. 12 shows an embodiment in which in the end region 25 a reduced density is realized. The reduced density provided in the subsequent overlap region 14 is specifically matched to the density of the bearing region 16 which is higher relative thereto in such a manner that after the forming in the bearing region 16 and in the overlap region 14 substantially the same preload forces can be realized although the compression in the overlap region 14 is stronger by the wall thickness 17 of the connecting section 10.

Figure 13:
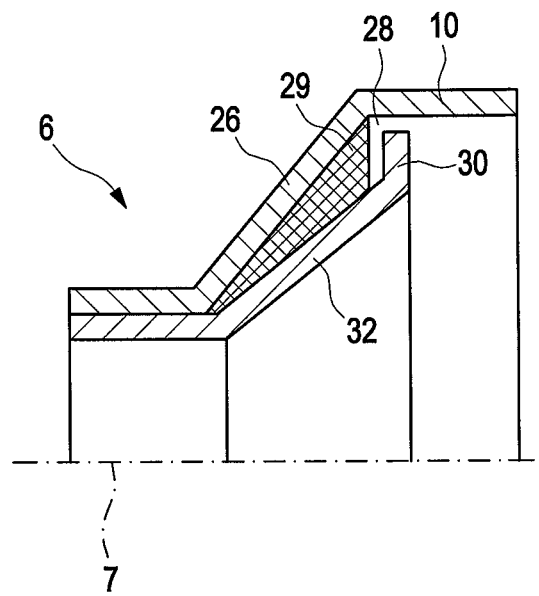
FIG. 13 is a sectional view showing an embodiment with a double-walled funnel.
Figure 14:
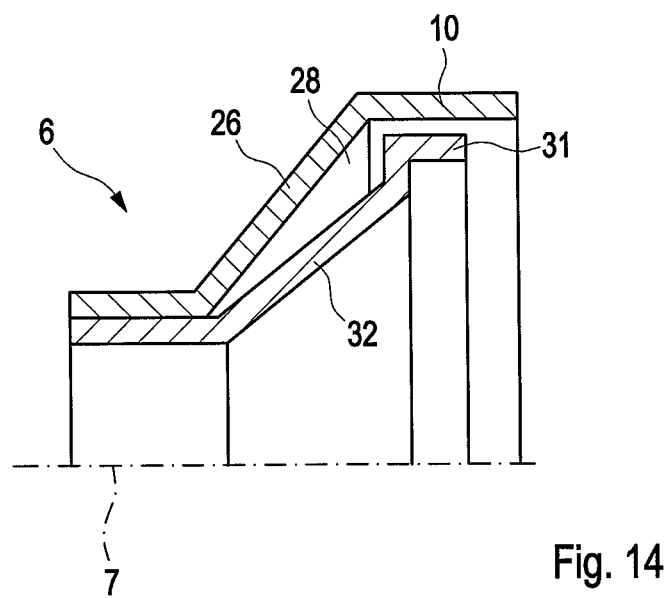
FIG. 14 is a sectional view showing another embodiment with a double-walled funnel.

Although in the FIGS. 6 to 9 the respective funnel 6 is represented as a single-walled funnel 6, a two-walled funnel 6 can also be provided according to the FIGS. 13 and 14. The respective two-walled funnel 6 then has an outer funnel 26 and an inner funnel 32 which is arranged concentrically therein. The outer funnel 26 comprises the connecting section 10 for plugging on or plugging in on the jacket 5. The inner funnel 32 is radially spaced from the outer funnel 26 at least in the respective conical region of the funnel 6 in order to thus form a ring gap 28, which leads to a ring gap insulation or air gap insulation. According to FIG. 13, a thermally insulating insulation material 29 can be arranged in the ring gap 28.

In the embodiment shown in FIG. 13, the inner funnel 32 is equipped with a radially projecting collar 30 on its end facing the monolith 8, which is practically dimensioned so that this ring-shaped collar 30 after the calibrating covers the ring space 23 on an axial face end of the bearing mat 9, thus protecting it from the direct exposure to hot exhaust gas. In contrast with this, FIG. 14 shows an embodiment in which the end of the inner funnel 32 facing the monolith 8 comprises an axially projecting collar 31, which after calibrating dips into the ring space 23 in order to largely close off the same. In this way, efficient protection of the bearing mat 9 from exhaust gas can likewise be achieved.

While specific embodiments of the invention have been shown and described in detail to illustrate the application of the principles of the invention, it will be understood that the invention may be embodied otherwise without departing from such principles.

The invention claimed is:

1. A method for producing an exhaust gas aftertreatment device comprising a housing assembled of a jacket, closed in circumferential direction, and two face end funnels and at least one monolith for the exhaust gas aftertreatment, the method comprising the steps of:
   assembling and filling the housing, for the purpose of which the at least one monolith together with at least one bearing mat, enclosing the at least one monolith in the circumferential direction, is axially inserted in the jacket, and for the purpose of which the funnels are each plugged into the jacket or plugged onto the jacket with an axial connecting section which is formed complementarily to a cross section of the jacket in such a manner that the respective connecting section and an axial end section of the bearing mat axially overlap in an overlap region; and
   calibrating the housing, for the purpose of which the jacket including the connecting sections of the funnel, starting out from an initial cross section, is reduced to a final cross section in order to create in the at least one bearing mat, at least in a bearing region extending from the one connecting section to the other connecting section, a predetermined radial preload for retaining the at least one monolith in the jacket, wherein the housing is calibrated after the funnels are each plugged into the jacket or plugged onto the jacket.

2. The method according to claim 1, wherein calibrating is carried out so that an outer cross section of the jacket is constant over the entire axial length of the bearing region and comprises a stepped-section in end regions which are plugged in contact with the connecting sections.

3. The method according to claim 2, wherein the cross-sectional reduction in the bearing region is greater by a wall thickness of a respective connecting section than in the connecting section.

4. The method according to claim 2, wherein calibrating is carried out with a calibrating tool, which comprises a pushing contour formed complementarily to an outer contour of the jacket for applying pressure forces reducing the cross section of the jacket, wherein the calibrating tool comprises a step, in a region of one of the connecting sections.

5. The method according to claim 1, wherein calibrating is carried out so that an outer cross section of the jacket, including end regions plugged with the connecting sections, is constant over an entire axial length of the jacket.

6. The method according to claim 5, wherein the at least one bearing mat in the respective overlap region has at least one of a reduced wall thickness and a reduced density.

7. The method according to claim 1, wherein the funnels are fastened to the jacket after assembling and before calibrating.

8. The method according to claim 1, wherein the funnels, after calibrating, are each fastened to the jacket through at least one closed circumferential weld seam.

9. The method according to claim 1, wherein:
   before assembling the housing at least one of the at least one monolith and the at least one bearing mat is measured in order to determine parameters required for calibrating and
   calibrating is carried out dependent on previously determined parameters.

10. The method according to claim 1, wherein the funnels are formed separate from the housing, the at least one bearing mat comprising a planar bearing mat surface extending continuously, without interruption, from an end of one of the funnels to an end of another one of the funnels, the jacket comprising an inner planar jacket surface, the inner planar jacket surface being in direct contact with the planar bearing mat surface in the bearing region of the at least one bearing mat.

11. The method according to claim 1, wherein the jacket comprises a planar jacket end portion, the axial connecting section comprising a planar axial connecting end portion, the planar jacket end portion being in direct contact with the planar axial connecting end portion during calibration of the housing.

12. A method for producing an exhaust gas aftertreatment device, the method comprising:
  enclosing at least one monolith in a circumferential direction of the at least one monolith with at least one bearing mat to form a monolith bearing mat structure;
  inserting the monolith bearing mat structure in a jacket of a housing in an axial direction of the jacket;
  connecting funnels to the jacket, wherein one of the funnels is connected one end of the jacket and another one of the funnels is connected to another end of the jacket, each of the funnels comprising an axial funnel connecting section, the axial funnel connecting section being formed complementarily to a cross section of the jacket, the axial funnel connecting section axially overlapping an axial end section of the at least one bearing mat and an axial end section of the jacket axially with respect to the axial direction of the jacket to define an axial overlap region, the at least one bearing mat comprising a bearing region extending from the axial funnel connecting section of the one of the funnels to the axial funnel connecting section of the another one of the funnels;
  applying a force to the housing after each end of the jacket is connected to a respective funnel such that a predetermined radial preload is created in at least the bearing region to retain the at least one monolith in the jacket, the housing comprising an initial cross section dimension prior to the force being applied to the housing, the housing comprising a final cross section dimension after the force is applied to the housing, the final cross section dimension being less than the initial cross section dimension.

13. The method according to claim 12, wherein the force is applied so that an outer cross section of the jacket is constant over an entire axial length of the bearing region and the jacket comprises a stepped-section in end regions which are in contact with the connecting sections.

14. The method according to claim 13, wherein a cross-sectional reduction in the bearing region is greater by a wall thickness of a respective connecting section than in the connecting section.

15. The method according to claim 13, wherein the force is applied via a calibrating tool, the calibrating tool comprising a pushing contour formed complementarily to an outer contour of the jacket for applying pressure forces reducing a cross section of the jacket, wherein the calibrating tool comprises a step in a region of the axial funnel connecting section of one of the funnels.

16. The method according to claim 12, wherein the force is applied to the housing so that an outer cross section of the jacket, including end regions connected with the axial funnel connecting sections, is constant over an entire axial length of the jacket.

17. The method according to claim 16, wherein the at least one bearing mat in the respective overlap region has at least one of a reduced wall thickness and a reduced density.

18. The method according to claim 12, wherein each of the funnels is formed separate from the housing, the at least one bearing mat comprising a planar bearing mat surface extending continuously, without interruption, from an area adjacent to an end of one of the funnels to a region adjacent to an end of another one of the funnels, the jacket comprising an inner planar jacket surface, the inner planar jacket surface being in direct contact with the planar bearing mat surface in the bearing region of the at least one bearing mat.

19. The method according to claim 12, wherein the jacket comprises a first planar jacket end portion and a second planar jacket end portion, the axial funnel connecting section of the one of the funnels comprising a first planar axial connecting end portion, the axial funnel connecting section of the another one of the funnels comprising a second planar axial connecting end portion, the first planar jacket end portion being in direct contact with the first planar axial connecting end portion and the second planar jacket end portion being in direct contact with the second planar axial connecting end portion when the force is applied to the housing, the force being applied at least to the first planar jacket end portion and the first planar axial connecting end portion.

20. The method according to claim 12, wherein the funnels are fastened to the jacket after assembling and before applying the force to the housing.

21. The method according to claim 12, wherein each of the funnels, is fastened to the jacket through at least one closed circumferential weld seam after the force is applied to the housing.

22. The method according to claim 12, wherein:
  before assembling the housing at least one of the at least one monolith and the at least one bearing mat is measured in order to determine parameters required for calibrating; and
  the force is applied to the housing based on previously determined parameters.

23. A method for producing an exhaust gas aftertreatment device, the method comprising:
  surrounding at least one monolith in a circumferential direction of the at least one monolith with at least one bearing mat to form an enclosed monolith structure, the at least one bearing mat comprising a first bearing mat axial end portion and a second bearing mat axial end portion;
  inserting the enclosed monolith structure in an interior space of a jacket of a housing in an axial direction of the jacket, the jacket comprising a first axial jacket end portion and a second axial jacket end portion;
  providing a first funnel and a second funnel, the first funnel comprising a first axial funnel connecting section, the second funnel comprising a second axial funnel connecting section;
  connecting the first funnel to the first axial jacket end portion and connecting the second funnel to the second axial jacket end portion, the first axial funnel connecting section being formed complementarily to a first jacket cross section of the first axial jacket end portion, the second axial funnel connecting section being formed complementarily to a second jacket cross section of the second axial jacket end portion, the first axial funnel connecting section axially overlapping the first bearing mat axial end portion and the first axial jacket end portion with respect to the axial direction of the jacket to define a first axial overlap region, the second axial funnel connecting section axially overlapping the second bearing mat axial end portion and the second axial jacket end portion with respect to the axial direction of the jacket to define a second axial overlap region, the at least one bearing mat comprising a bearing region extending from the first axial funnel connecting section to the second axial funnel connecting section;

applying a force to the housing after the first funnel and the second funnel are connected to the jacket such that a predetermined radial preload is generated in at least the bearing region to retain the at least one monolith in the jacket, the housing comprising an initial cross section dimension prior to the force being applied to the housing, the housing comprising a final cross section dimension after the force is applied to the housing, the final cross section dimension being less than the initial cross section dimension.

24. The method according to claim 23, wherein the first axial jacket end portion comprises a first planar jacket end portion and the second axial jacket end portion comprises a second planar jacket end portion, the first axial funnel connecting section comprising a first planar axial connecting end portion, the second axial funnel connecting section comprising a second planar axial connecting end portion, the first planar jacket end portion being in direct contact with the first planar axial connecting end portion and the second planar jacket end portion being in direct contact with the second planar axial connecting end portion when the force is applied to the housing, the force being applied at least to the first planar jacket end portion and the first planar axial connecting end portion, the first funnel and the second funnel being formed separate from the housing.

* * * * *